UNITED STATES PATENT OFFICE.

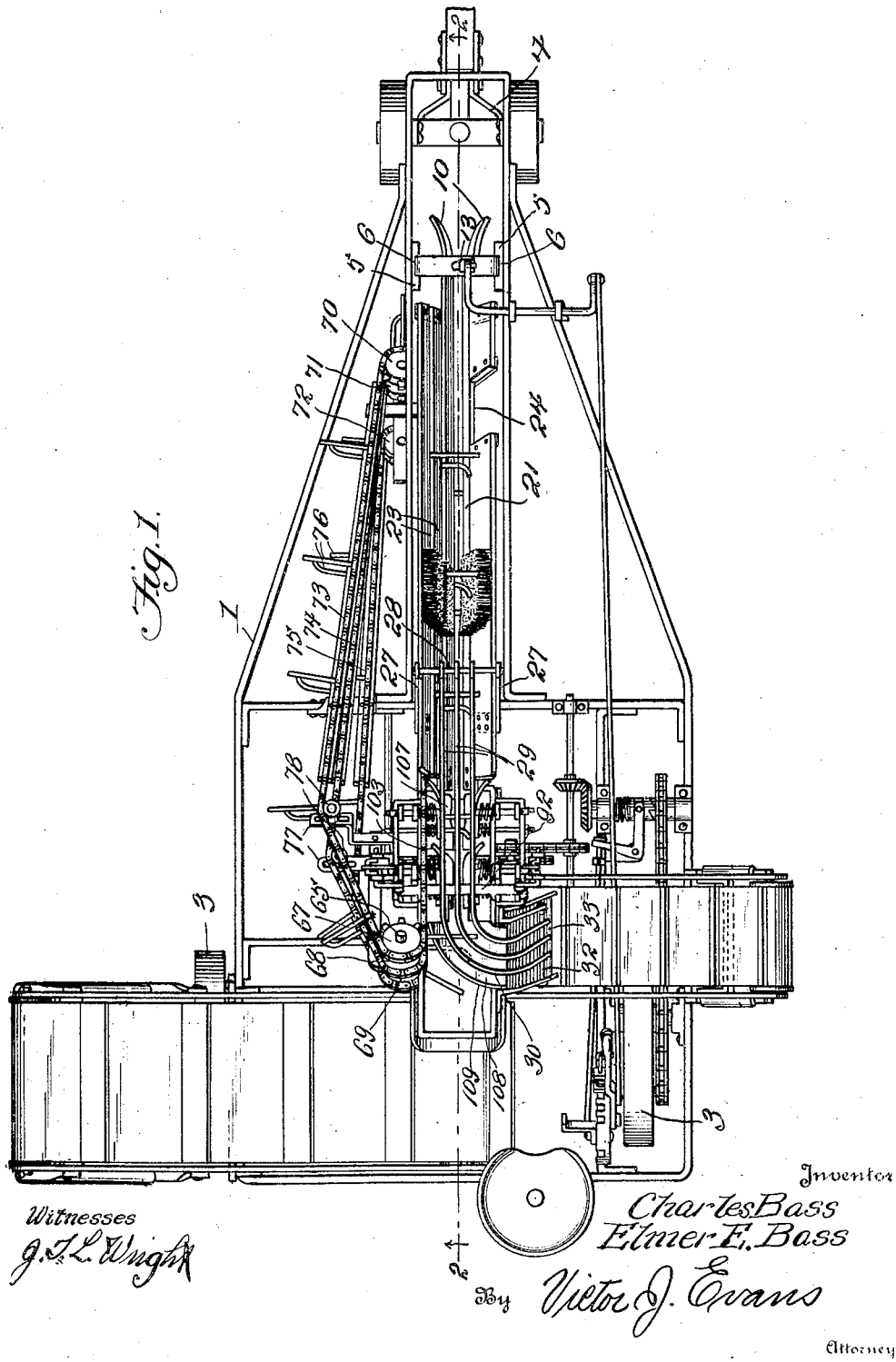

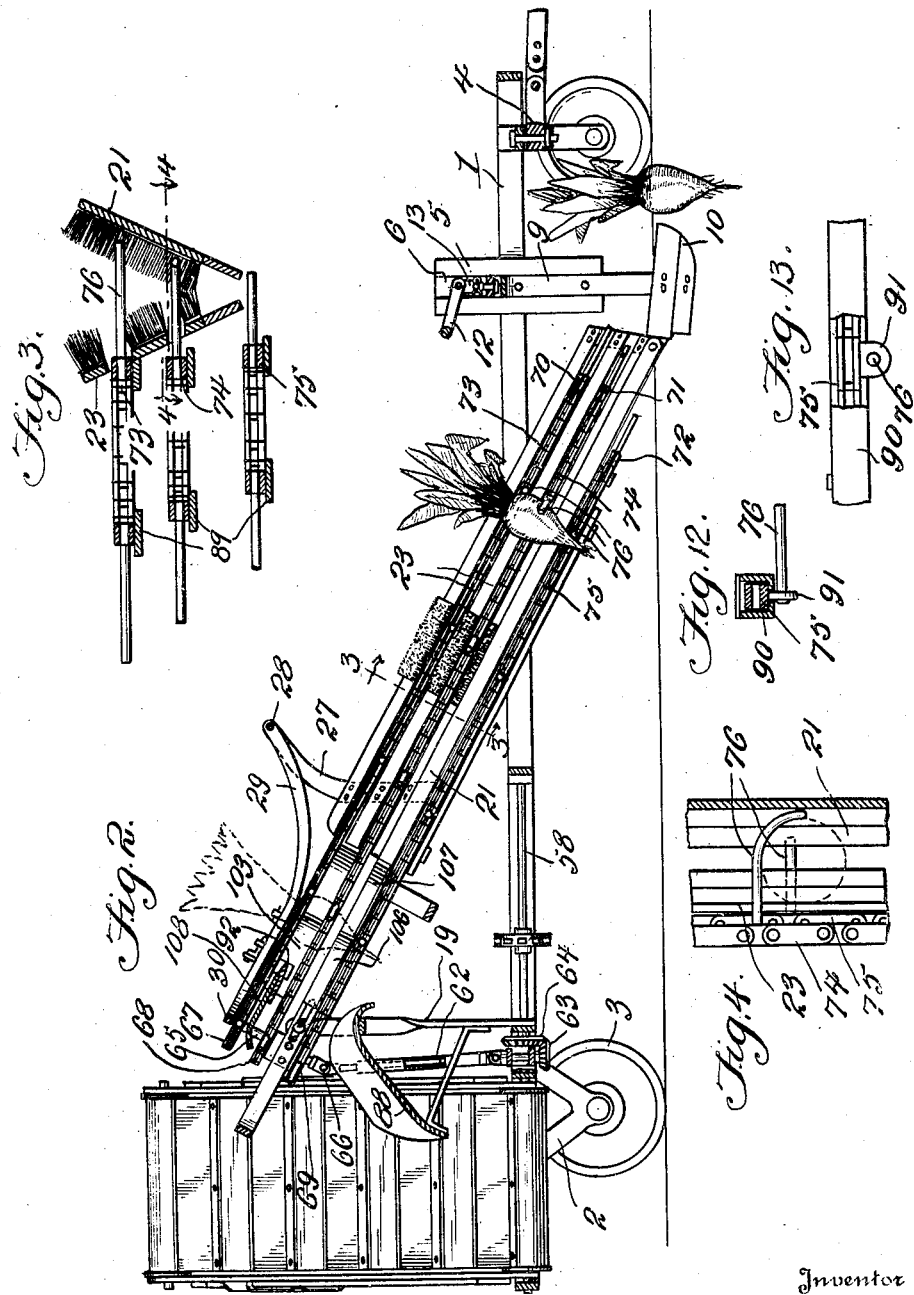

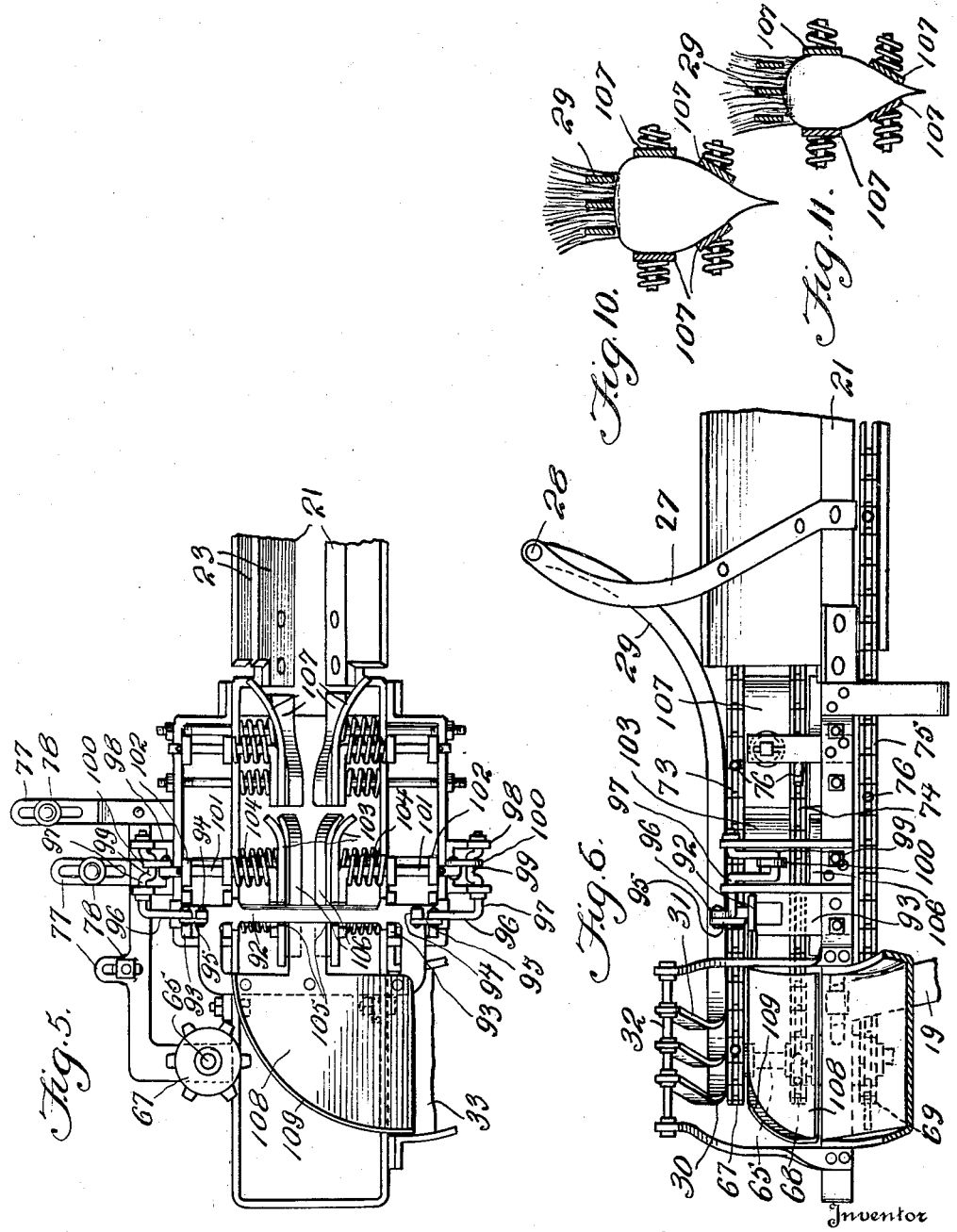

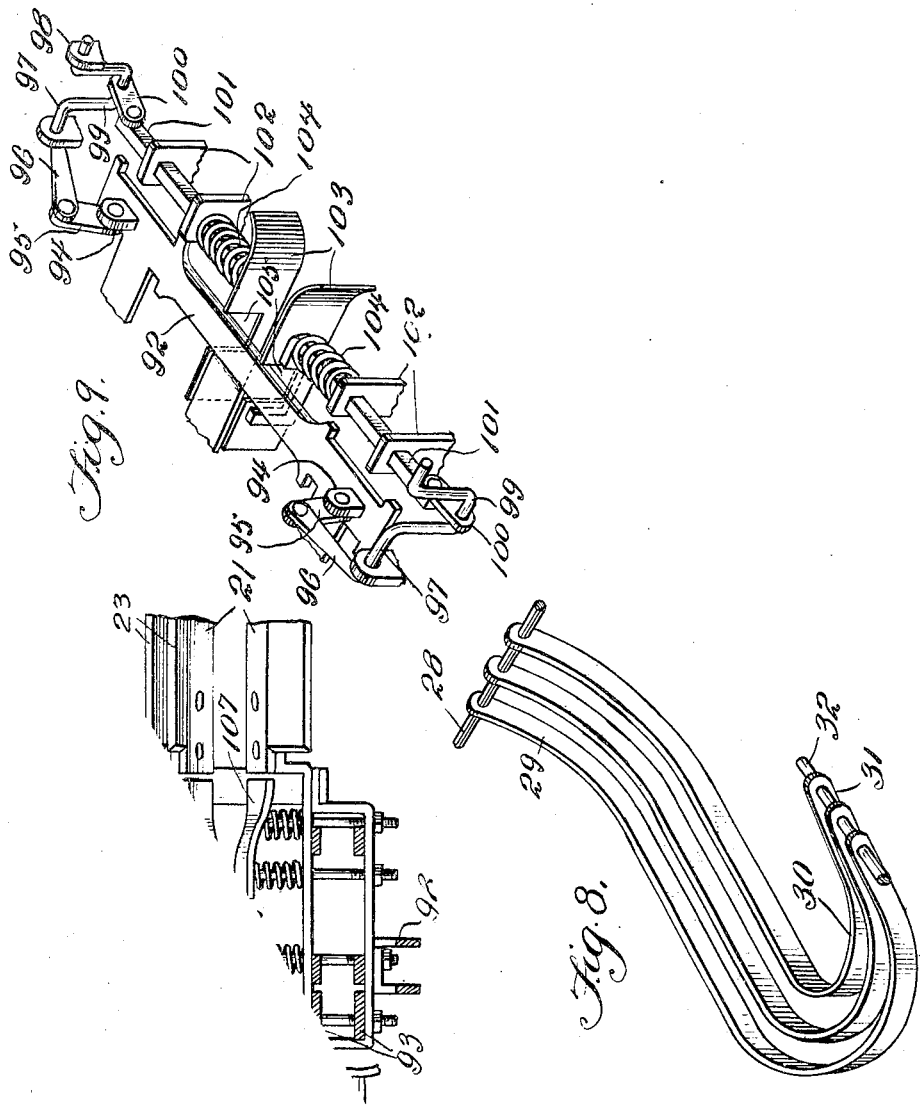

CHARLES BASS AND ELMER E. BASS, OF ENID, OKLAHOMA.

BEET-HARVESTER.

1,290,049.   Specification of Letters Patent.   Patented Jan. 7, 1919.

Application filed February 12, 1918. Serial No. 216,818.

*To all whom it may concern:*

Be it known that we, CHARLES BASS and ELMER E. BASS, citizens of the United States, residing at Enid, in the county of Garfield and State of Oklahoma, have invented new and useful Improvements in Beet-Harvesters, of which the following is a specification.

This invention relates to beet harvesters and it consists in the novel features hereinafter described and claimed.

An object of the invention is to provide a harvester of the character stated which is adapted to be drawn or moved over the surface of the ground and which includes means for digging the beets from the soil and elevating them upwardly and rearwardly and substantially in upright position.

A cutting apparatus is located at the upper rear portion of the said elevating means and is adapted to encounter the upper parts of the bodies of the beets as they move to the delivery end of the said means whereby the said beets are successively decapitated. Means are provided for shifting the cutting apparatus in order to accommodate the same to long or short beets whereby the incision or decapitation takes place approximately at the same line or point from the upper ends of the beets irrespective of their respective longitudinal dimensions. That is to say in long beets the heads are removed at lines relatively remote from the upper ends of the beets and in short beets the heads are removed at lines comparatively close to the upper ends of the same.

Means are provided for conveying the detached heads to one side of the machine.

In the accompanying drawing

Figure 1 is a top plan view of the beet harvester.

Fig. 2 is a vertical longitudinal sectional view of the same.

Fig. 3 is a transverse view of an intermediate portion of the machine cut on the line 3—3 of Fig. 2.

Fig. 4 is a detailed sectional view cut on the line 4—4 of Fig. 3.

Fig. 5 is a plan view of the upper rear portion of the machine.

Fig. 6 is a side elevation of the same showing parts in section.

Fig. 7 is a plan view of the upper rear portion of the machine showing parts in section.

Fig. 8 is a perspective view of beet depressors and top guides used in the machine.

Fig. 9 is a perspective view of the cutting apparatus of the beet harvester.

Fig. 10 is a transverse sectional view of the beet retaining means showing a relatively large beet in position therein.

Fig. 11 is a similar view showing a relatively small beet in position therein.

Fig. 12 is a transverse sectional view of a modified form of chain support which may be used upon the harvester.

Fig. 13 is a top plan view of the same showing parts broken away.

The beet harvester comprises a frame 1 which may be of metal or any other suitable material and which is provided at its rear end portion and at its opposite sides with brackets 2 having ground or supporting wheels 3 journaled thereto. A truck 4 is pivotally connected with the forward end portion of the frame 1 and supports the forward part of the frame. Draft appliances of any desired form or pattern may be connected with the truck 4 in a usual manner.

Standards 5 are attached to the side members of the frame 1 and in the vicinity of the forward end thereof and the said standards are provided at their inner portions with vertically disposed grooves 6. The grooves 6 hold brackets 9 to the lower end of which are attached plows 10 and the forward end of a trough 21 the rear end of which is supported on standards 19.

The sides of the trough 21 are downwardly inclined toward each other as best shown in Fig. 3 of the drawing and the bottom of the said trough is open. One side of the trough 21 is made up of a series of spaced slats 23. That side of the trough 21 which is opposite the side composed of the spaced slats 23 is provided with an opening 24 located in the vicinity of its lower forward end and clods of earth or large stone may fall through the said opening as the beets are elevated along the trough as hereinafter described.

Standards 27 are carried at the sides of the trough 21. A cross rod 28 connects the upper ends of the standards 27 together and depressor arms 29 are connected at their forward ends with the rod 28. The said arms 29 are spaced from each other and from the rod 28 the arms are curved downwardly and extended rearwardly. The rear portions 30 of the arms 29 are curved laterally as best shown in Fig. 8 and the rear extremities 31 extend upwardly and are attached to a rod 32 whereby the rear ends of the arms 29 are held spaced proper distances from each other.

When the beets move under the arms 29 as hereinafter described they are depressed or forced downwardly by the said arms in order that their upper portions may be properly positioned to pass over a cutting apparatus hereinafter described. Also the spaces between the arms 29 may receive the foliage at the upper portion of the beets and retain the said foliage above the cutting apparatus so that it will not interfere with the operation of the same. After the tops have been decapitated from the bodies of the beets they are directed laterally along the curved portions 30 of the arms 29 and the removed heads may fall from the rear portions 31 of the arms 29 upon an inclined chute 33 and from the said chute the heads may be disposed of as desired.

A vertically disposed shaft 62 is journaled for rotation upon the frame 1 and the said shaft 62 is made of telescopic sections as best shown in Fig. 2 of the drawing. Therefore the shaft 62 is longitudinally extensible. A beveled gear wheel 63 is connected with the lower end of the shaft 62 and meshes with a beveled gear wheel 64 mounted upon the shaft 58 driven by suitable gear. Therefore means are provided for transmitting rotary movement from the shaft 58 to the shaft 62.

A shaft 65 is journaled for rotation at the upper rear end of the trough 21 and at one side thereof and the lower end of the shaft 65 is operatively connected with the upper section of the shaft 62 by means of a universal joint 66. Therefore it will be seen that the shaft 65 is operatively connected with the shaft 62 and by reason of the fact that the shaft 62 is longitudinally extensible it may contract or expand as the trough 21 is moved up or down. Sprocket wheels 67, 68 and 69 are fixed to the shaft 65 and are spaced from each other. Sprocket wheels 70, 71 and 72 are journaled for rotation at the lower portion of the trough 21 and lie in same plane as those occupied by the sprocket wheels 67, 68 and 69. Chains 73, 74 and 75 are trained around the said alined sprocket wheels and inasmuch as the shaft 65 is rotated as hereinbefore described the inner runs of these chains are moved along the slotted or slatted side of the trough 21. The chains 73, 74 and 75 carry fingers 76. The fingers which are mounted upon the chains 73 and 75 are straight while the fingers which are mounted upon the chains 74 are curved longitudinally. The fingers which are carried by the chains 73 and 74 are adapted to move through the spaces between the slats 23 and the fingers which are carried by the chains 75 are adapted to move along the lower edges of the sides of the trough 21. When the beets are passed from the rear ends of the plows 10 they enter the forward end of the trough 21 and are encountered by the fingers 78 and carried up along the said trough. The straight fingers 76 bear against the upper and lower portions of the beets while the curved fingers 76 which are carried by the chains 74 extend around the intermediate portions of the bodies of the beets and hold them in proper position while they are passing along the trough. Brackets 77 are carried by the frame 1 and the said brackets support rollers 78 which bear against the outer runs of the chains 73, 74 and 75 and maintain the said chains at proper tension. The rollers 78 are adjustably mounted upon the brackets 77 and consequently they may be moved to take up any slack which may occur in the said chains.

As illustrated in Fig. 3 of the drawing strips 89 are located below the chains 73, 74 and 75 and prevent the intermediate portions of the said chains from sagging. As illustrated in the modified form shown in Figs. 12 and 13 the chains are supported by angle irons 90 and certain of the links of the chains are provided with depending lugs 91 which carry the fingers 76.

The cutting apparatus of the harvester is best illustrated in Fig. 9 of the drawing. This apparatus comprises a knife 92 which is disposed transversely across the path of movement of the beets and at the upper end of the trough 21. The knife 92 may move vertically between guides 93 carried by the frame 1 or extensions thereof. The knife 92 is provided at its upper side and in the vicinity of its ends with upstanding lugs 94 to which are pivotally connected the lower ends of links 95. The upper ends of the links 95 are pivotally connected with arms 96 which are carried by shafts 97 journaled in brackets 98 which are attached to the frame 1. The shafts 97 are provided at points between the brackets 98 with cranks 99 and links 100 are pivotally connected with the said cranks 99 and pivotally connected at their inner ends with bars 101. The said bars 101 are mounted for sliding movement in guides 102 mounted upon the frame 1. The bars 101 carry at their inner ends curved shoes 103 which are adapted to receive the upper portions of the beets between them. Springs 104 are interposed between the outer surfaces of the shoes 103 and the adjacent guides 102 and are under tension with a tendency to hold the shoes 103 toward each other.

The shoes 103 are provided at their upper portions and at points between their ends with recesses 105 which receive the intermediate portion of the knife 92. Consequently it will be seen that when a beet is received between the shoes 103 the said shoes will be moved away from each other against the tension of the springs 104 and consequently the bars 101 are moved longitudinally in the guides 102. Through the connecting links 100 the cranks 99 of the shafts 97 are swung about the axes of the said shafts and the shafts are turned whereby the arms 96 are swung and through the connecting links 95 the knife 92 is lowered. This movement on the part of the knife 92 may be great or small according to the diameter of the beet which enters between the shoes 103. That is to say if the beet of relatively great diameter enters between the shoes 103 the knife 92 is lowered considerably but if a beet of small diameter enters between the shoes 103 the lowering of the knife 92 is comparatively slight. Therefore means are provided for automatically adjusting the knife in order to properly position the same to make the incision in the upper portion of the beet to decapitate the same. Spring supported shoes 106 are located below the shoes 103 and are adapted to retain the lower portion of the beet while the tops are being removed therefrom. Spring supported guiding shoes 107 are located in advance of the shoes 103 and 106 and are adapted to direct the beets from the delivery end of the trough to the receiving end of the shoes 103 and 106.

A plate 108 is carried by the knife 92 and behind the rear edge thereof and the tops which are removed by the knife from the body of the beet move over the said plate 108 and are deflected by a curved flange 109 toward the chute 33 upon which the tops fall as hereinbefore described. The plate 108 performs the other function of holding the top portions of the beets up during the cutting operation and consequently the edges of the upper portions of the beets cannot sag during the cutting operation but are retained above the cutting edge of the knife until the top is completely severed from the body of the beet.

Having described the invention what is claimed is:—

1. A harvester comprising a frame, means for moving the beets mounted upon the frame, depressor bars located in the paths of movement of the beets and being spaced from each other and downwardly curved at their forward portions, the rear portions of the said bars being laterally curved and adapted to transmit the heads of the beets to one side.

2. A harvester comprising a frame, means for moving the beets along the frame, a knife located transversely across the path of movement of the beets, crank shafts journaled beyond the ends of the knife, means operatively connecting the shafts with the knife, shoes mounted at the sides of the path of movement of the beets and adapted to receive the beets between them, springs bearing against the shoes and means operatively connecting the shoes with the cranks of said shafts.

3. A harvester comprising a frame, means for moving the beets along the frame, a knife located across the path of movement of the beets and movable vertically, shoes located at the opposite sides of the path of movement of the beets and having recesses which receive the knife, crank shafts journaled at the end portions of the knife, means operatively connecting the crank shafts with the knife, and resiliently pressed means operatively connecting the shoes with the cranks of the shafts.

4. A harvester comprising a frame, means for moving beets along the frame, a knife located across the path of movement of the beets and movable vertically, means operatively connected with the knife and adapted to be contacted by the beets for moving the knife vertically, and a plate connected with the knife and extending rearwardly thereof.

5. A harvester comprising a frame, means for moving beets along the frame, a knife located across the path of movement of the beets and movable vertically, means adapted to be contacted by the beets for moving the knife vertically, a plate connected with the rear portion of the knife and a curved flange located upon the said plate.

6. A harvester comprising a frame, means for moving beets along the frame, spring pressed directing shoes adapted to receive the beets from said means, other spring pressed shoes adapted to receive the beets from the directing shoes and a knife located across the path of movement of the beets and adapted to operate upon the beets while they are between the last mentioned shoes.

7. A beet harvester comprising a frame, means for moving the beets along the frame, directing shoes adapted to receive the beets from the moving means, other shoes adapted to receive the beets from the directing shoes, a knife located transversely across the path of movement of the beets and spring operated means connected with the knife and the last mentioned shoes for adjusting the knife with relation to the beets.

8. A harvester comprising a frame, means for moving beets along the frame, spring pressed directing shoes adapted to receive the beets from the moving means, other spring pressed shoes adapted to receive the beets from the directing shoes, both sets of shoes being arranged in pairs, one pair being located above the other, a knife disposed across the path of movement of the beets and means operatively connecting the knife with the upper pair of the last mentioned shoes and adapted to effect the adjustment of the knife with relation to the beet which is received between the last mentioned shoes.

In testimony whereof we affix our signatures.

CHARLES BASS.
ELMER E. BASS.